3,392,095
PHOTOCHEMICAL PROCESS FOR PREPARING SULFONIC ACIDS

Harold L. Dimond, Ross Township, Allegheny County, Vincent J. Pascarella, Erie, and Arthur C. Whitaker, Pittsburgh, Pa., assignors to Gulf Research & Development Company, Pittsburgh, Pa., a corporation of Delaware
No Drawing. Filed Oct. 20, 1965, Ser. No. 499,067
16 Claims. (Cl. 204—158)

This invention relates to a process for preparing sulfonic acids, $RSO_3H$, involving the catalytic oxidation of an organic compound of sulfur selected from the group consisting of mercaptans and disulfides.

Mercaptans that can be oxidized in accordance with the procedure defined herein can be defined by the following general formula:

RSH wherein R can be an alkyl group having from one to 30 carbon atoms, preferably from one to 25 carbon atoms, such as methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-heneicosyl, n-docosyl n-tricosyl, n-tetracosyl, n-pentacosyl, n-hexacosyl, n-heptacosyl, n-octacosyl, n-triacontyl, isomers of said normal alkyls, cyclopentyl, cyclohexyl cyclooctyl etc., or an aryl group having from six to 30 carbon atoms, preferably from six to 14 carbon atoms, such as phenyl, naphthyl, diphenyl, p-terphenyl, p-quaterphenyl, benzyl, anthracyl, phenanthryl, pyridyl, etc.

Disulfides that can be subjected to oxidation in accordance with the procedure defined herein can be defined by the following general formula:

R'SSR'' wherein R' and R'', the same or different, can be selected from the group of alkyl and aryl groups defined by R above.

Specific examples of mercaptans that can be employed herein include methanethiol, ethanethiol, propanethiol, n-butanethiol, n-pentanethiol, n-hexanethiol, n-heptanethiol, n-octanethiol, n-nonanethiol, n-decanethiol, n-undecanethiol, n-tridecanethiol, n-tetradecanethiol, n-pentadecanethiol, n-hexadecanethiol, n-heptadecanethiol, n-octadecanethiol, n-nonadecanethiol, n-eicosanethiol, n-docosanethiol, n-tricosanethiol, n-tetracosanethiol, n-pentacosanethiol, n-hexacosanethiol, n-heptacosanethiol, n-octacosanethiol, n-nonacosanethiol, n-tricontanethiol, isomers of said normal mercaptans, cyclohexanethiol, cyclopentanethiol, benzenethiol, benzyl mercaptan, 2-naphthalenethiol, 3-pyridinethiol, p-phenylbenzenethiol, etc.

Specific examples of disulfides than can be employed herein include di-n-butyl disulfide, di-n-octyl disulfide, di-n-undecyl disulfide, dimethyl disulfide, diethyl disulfide, dibenzyl disulfide, dicyclopentyl disulfide, dicyclohexyl disulfide, dicyclooctyl disulfide, isopropyl-2-naphthyl disulfide, diphenyl disulfide, di-2-naphthyl disulfide, di-3-pyridyl disulfide, phenylbenzyl disulfide, etc. Other disulfides in addition to the ones embraced by the formula R'SSR'', defined above, can also be employed, for example, hydrogen persulfide, $M_2S_2$ wherein M can be an alkali metal such as sodium or potassium or a halogen such as fluorine or chlorine, etc.

The R groups in the mercaptan or disulfide can contain other elements beside carbon and other functional groups in addition to SH, when their presence is intended to enhance the properties of the final product, without impairing the oxidation of the mercaptan function. In some instances, these elements and functions may themselves undergo oxidation. In these instances, the oxidant employed herein, molecular oxygen, must be provided to take such reaction into account. If, on the other hand, it is desired to stay within the limits recommended herein, such elements and functional groups must be chosen which are immune to the conditions of the reaction. For example, aldehydes will be converted to acids, sulfoxides to sulfones, sulfones to sulfonates, nitroso groups to nitro groups, etc. On the other hand, groups such as acids, nitrates or sulfates will resist the oxidative effects of the molecular oxygen under the conditions prescribed herein.

The mercaptans and the disulfides defined above are oxidized in accordance with the procedures of this invention by oxidizing the same with molecular oxygen in a selected solvent in the presence of catalytic amounts of a nitrogen oxide selected from the group consisting of NO, $NO_2$, $N_2O_3$, $N_2O_4$ and $N_2O_5$ (preferably $NO_2$), water and actinic light.

As noted, the oxidant employed herein is molecular oxygen. Any gas containing molecular oxygen, such as oxygen itself or air, can be employed. In this case wherein the defined mercaptans are being oxidized the amount of molecular oxygen required is at least the amount stoichiometrically required to convert the mercaptans to the corresponding sulfonic acids. To convert one mol of the mercaptan to the corresponding sulfonic acid, one and one-half mols of molecular oxygen are stoichiometrically required. To oxidize the disulfide, about 2.5 mols of molecular oxygen are required. However, in each instance, excess amounts of molecular oxygen can be employed, and in order to effect the desired reaction in a reasonable amount of time, from about two to about four times the amount of molecular oxygen required for the desired conversion is preferred.

The nitrogen oxide employed herein, as noted, is selected from the group consisting of NO, $NO_2$, $N_2O_3$, $N_2O_4$ and $N_2O_5$ (preferably $NO_2$). The oxygen required for the present oxidation is supplied by the molecular oxygen defined above and not by the nitrogen oxide defined above, and therefore the latter is employed in small catalytic amounts. Thus, the amount of nitrogen oxide required can be at least about three percent by weight, preferably from about eight to about 25 percent by weight, based on the amount of mercaptan or disulfide being oxidized.

We have disclosed the use of $NO_2$ in the procedure defined above. It must be pointed out that an equilibrium between $NO_2$ and $N_2O_4$ exists over a relatively large temperature range (approximately $-11°$ C. to $+140°$ C.) at atmospheric pressure. At low temperatures, $NO_2$ becomes $N_2O_4$, a honey-colored liquid. At high temperatures $N_2O_4$ becomes $NO_2$, a red-brown gas. Accordingly, whenever $NO_2$ is mentioned herein, $N_2O_4$ is also intended to be covered thereby under conditions conducive to its formation.

In addition to molecular oxygen and catalytic amounts of nitrogen oxides, it is imperative that the oxidation reaction of this invention be carried out in the presence of a controlled amount of water. From about 0.001 to about 25 molar percent of water, preferably from about three to about 10 molar percent of water, relative to the nitrogen oxides is required. Below the defined amounts of water, little or no desired reaction takes place; above the defined amounts poor yields of desired product are obtained.

The reaction must be carried out in a suitable solvent, which includes chlorinated hydrocarbons, such as carbon tetrachloride, tetrachloroethane, hexachloroethane, chloroform, etc., and aromatic compounds, such as benzene, toluene, ortho-, meta- and para-xylene, cumene, etc. In general, these solvents facilitate the desired reaction without adversely affecting either the reactants or the desired reaction products and are of the type that are suitable for carrying out free radical reactions. The amount of solvent required can be varied over a wide range, but will generally constitute from about 50 to about 98 percent, preferably from about 75 to about 95 percent, of the reaction mixture.

The reaction is initiated by carrying out the same in the presence of a suitable light source, such as actinic light. This can include light having wave lengths of from about 2000 to 10,000 A., preferably from about 4500 to 8500 A. A specific example of such light is that produced by an ordinary white light bulb. After the reaction has begun, the light can be extinguished.

The reaction is effected by bringing together the mercaptan or disulfide, molecular oxygen, nitrogen oxide catalyst, water and solvent in the presence of a suitable light source at a suitable temperature and pressure. A temperature of about 0° to about 50° C., preferably of about 10° to about 30° C., and a pressure of about one to about 40 pounds per square inch gauge, preferably of about five to about 30 pounds per square inch gauge can be employed. The reaction time can be, for example, at least about 0.25 hour, preferably from about 0.5 to about four hours.

At the end of the reaction period the pressure is reduced and the product can be subjected to distillation conditions, for example, a temperature of about 90° to about 200° C. and a pressure of about 0.5 to about 50 millimeters of mercury, to remove from the oxidation product any unreacted mercaptan or disulfide, oxygen, solvent or nitrogen oxide that may be present. The workup at this point will depend upon whether a mercaptan or a disulfide has been subjected to the desired oxidation. If a mercaptan has been employed as charge, the product remaining will be the corresponding sulfonic acid. If desired, the sulfonic acid can be reacted with a stoichiometric amount of a basic reagent, such as sodium hydroxide, at a temperature of about 80° to about 200° C. and a pressure of about 15 to about 500 pounds per square inch gauge for about one minute to about eight hours to obtain the corresponding sodium salt which can be employed as a detergent.

If, however, a disulfide has been employed as charge, the work-up after removal of the defined material from ing acids by treatment with acids, such as $H_2SO_4$, or HCl, or with acidic ion exchange resins, at room or slightly elevated temperatures.

The process of this invention can further be understood by reference to the following:

Example I

A number of runs were made in which n-dodecanethiol was subjected to oxidation with molecular oxygen under various conditions. White light, used in some runs to initiate the reaction, was obtained from a 150 watt bulb. An ultraviolet lamp, radiating in the range of 3500 to 4500 A., was used in other runs. Run No. 1 was carried out as follows, and the remaining runs were varied as indicated in the table below. Into a magnetically-stirred, glass reactor there was charged 100 milliliters of dry carbon tetrachloride. Into a graduate there was placed 100 milliliters of carbon tetrachloride containing approximately 0.0128 gram of water. This was cooled to 0° C. To the cold, wet carbon tetrachloride was added a catalytic amount (0.46 gram or 0.01 mol) of $NO_2$. The reactor was purged with oxygen, and the aforesaid mixture was charged thereto. The pressure was raised to 10 pounds per square inch gauge with pure oxygen. To a graduated addition tube, connected to the reactor, there was charged 25.2 grams of 98 percent pure n-dodecanethiol (0.122 mol on a 100 percent basis). A 150 watt, white light bulb was placed ¼ inch to one inch from the reactor flask to illuminate the reaction mixture. The contents of the graduated addition tube were added dropwise to the reaction mixture over a period of 139 minutes. The reaction appeared to start after a short induction period of 22 minutes, at which point the light was extinguished. Reaction took place at room temperature and was permitted to proceed for an additional period of about 18 hours. The pressure was released, and after the product was evaporated to a total volume of 50 cc., 50 milliliters of 10 percent aqueous sodium hydroxide was added thereto. The mixture was held at reflux for five hours, and the final product was dried under vacuum to produce 36 grams of n-dodecane sulfonate, which amounts to a yield of about 85 percent. The results of this run as well as the remaining runs are summarized below in Table I.

TABLE I

| Run No. | Temperature, °C. | Induction Time, Minutes | Reaction Time, Minutes | Mol Percent $NO_2$ based on mercaptan | Activator | Mols Water Relative to Mols $NO_2$, Percent | Solvent | Volume Of Solvent In Milliliters | Yield, Mol Percent |
|---|---|---|---|---|---|---|---|---|---|
| 1 | 27±2 | 22 | 177 | 8.2 | White Light | 7.1 | $CCl_4$ | 200 | 85 |
| 2 | 26 | 15 | 48 | 8.2 | ---do--- | 14.2 | $CCl_4$ | 200 | (¹) |
| 3 | 28 | ------ | 53 | 12.16 | None | 7.1 | $CCl_4$ | 120 | (¹) |
| 4 | 40 | 38 | 71 | 17.7 | ---do--- | None | $CCl_4$ | 100 | (¹) |
| 5 | 25 | 21 | 180 | 17.7 | U.V., 16 mins; Infrared, 5 mins. | None | $CCl_4$ | 270 | (¹) |
| 6 | 24 | ------ | 25 | 8.0 | White Light | 7.1 | Acetone | 100 | (¹) |
| 7 | 26 | 2 | 68 | 18.87 | ---do--- | 7.1 | Hexane | 100 | (¹) |
| 8 | 26 | 13 | 131 | 16.4 | ---do--- | 3.55 | Benzene | 100 | 76.4 |

¹ Negligible.

the reaction product is different, for we believe the material remaining is not a sulfonic acid but a compound which can be defined by the following general formula:

$$R'—SO_2—O—SO_2R''$$

wherein R' and R'' are as defined hereinabove. This intermediate product can be hydrolyzed with water or a basic reagent, such as sodium hydroxide, potassium hydroxide, calcium hydroxide, ammonium hydroxide. Acid or aqueous hydrolysis yields two molecules of sulfonic acid, while basic treatment yields the corresponding salt. The acid can be recovered from the hydrolysis product by extraction with a suitable solvent or by distillation, as described above. The basic salts can be recovered from the basic mixture by precipitation with solvents, such as acetone, or by evaporation and recrystallization. If desired, the latter salts can be converted to the corresponding With reference to the data in the above table, it can be seen from Run No. 1 that excellent yields are obtained when the process is carried out in accordance with the dictates of this invention. Run No. 2 shows that with excess water in the system no reaction is obtained. Runs Nos. 3, 4 and 5 indicate that an activator and water are required for the reaction to proceed as desired. Run No. 8 shows that in addition to a chlorinated hydrocarbon an aromatic hydrocarbon can be employed as a solvent. However, Runs Nos. 6 and 7 prove that non-chlorinated hydrocarbons and oxygenated compounds are not suitable as solvents.

Example II

Into a magnetically-stirred, glass reactor, there was charged 100 milliliters of $CCl_4$, containing about 0.0128 gram of water. The reactor was cooled to 0° C., purged with oxygen gas, charged with 0.46 gram (0.01 mol) of $NO_2$, and pressured to 10 pounds per square inch gauge with pure oxygen. To a graduated addition tube, connected to the reactor, there was charged 75 milliliters of dry $CCl_4$ and 20.4 grams (0.0506 mol) of didodecyl disulfide. A 150 watt, white light bulb was placed one-fourth to one inch from the reaction flask to illuminate the reaction mix. The contents of the graduated addition tube were added dropwise at room temperature to the reaction mixture over a period of 195 minutes. Oxygen absorption started after a short induction period of three minutes, the light was extinguished, and the reaction continued for 255 minutes. The system was allowed to stand under oxygen pressure for an additional 16 hours. The pressure was then released, $CCl_4$ was removed by evaporation, and the residue was digested with the stoichiometric amount of NaOH in 200 milliliters of water. The product was recovered by evaporating the reaction mixture to 25 milliliters on a steam bath, triturating with acetone and filtering. The solid so obtained, plus that recovered by repeating the above procedure with the filtrate, amounted to 25.7 grams (97 percent yield) of sodium dodecanesulfonate.

Obviously, many modifications and variations of the invention, as hereinabove set forth, can be made without departing from the spirit and scope thereof, and therefore only such limitations should be imposed as are indicated in the appended claims.

We claim:
1. A process for converting an organic compound of sulfur selected from the group consisting of mercaptans and disulfides to a sulfonic acid which comprises subjecting said compound to oxidation with at least the stoichiometric amounts of molecular oxygen in the presence of a catalytic amount of a nitrogen oxide selected from the group consisting of NO, $NO_2$, $N_2O_3$, $N_2O_4$ and $N_2O_5$, a solvent selected from the group consisting of chlorinated hydrocarbons and aromatic hydrocarbons, and from about 0.001 to about 25 percent by weight of water, based on said nitrogen oxide, the reaction being initiated by actinic light.

2. A process for converting a mercaptan to a sulfonic acid which comprises subjecting said compound to oxidation with at least the stoichiometric amounts of molecular oxygen in the presence of a catalytic amount of a nitrogen oxdie selected from the group consisting of NO, $NO_2$, $N_2O_3$, $N_2O_4$ and $N_2O_5$, a solvent selected from the group consisting of chlorinated hydrocarbons and aromatic hydrocarbons, and from about 0.001 to about 25 percent by weight of water, based on said nitrogen oxide, the reaction being initiated by actinic light.

3. A process for converting an organic disulfide to a sulfonic acid which comprises subjecting said compound to oxidation with at least the stoichiometric amounts of molecular oxygen in the presence of a catalytic amount of a nitrogen oxide selected from the group consisting of NO, $NO_2$, $N_2O_3$, $N_2O_4$ and $N_2O_5$, a solvent selected from the group consisting of chlorinated hydrocarbons and aromatic hydrocarbons, and from about 0.01 to about 15 percent by weight of water based on said nitrogen oxide, the reaction being initiated by actinic light.

4. A process for converting an organic compound of sulfur selected from the group consisting of mercaptans and disulfides to a sulfonic acid which comprises subjecting said compound to oxidation with at least the stoichiometric amounts of molecular oxygen in the presence of a catalytic amount of $NO_2$, a solvent selected from the group consisting of chlorinated hydrocarbons and aromatic hydrocarbons, and from about three to about 10 percent by weight of water, based on said nitrogen oxide, the reaction being initiated by actinic light.

5. A process for converting a mercaptan to a sulfonic acid which comprises subjecting said compound to oxidation with at least the stoichiometric amounts of molecular oxygen in the presence of a catalytic amount of $NO_2$, a solvent selected from the group consisting of chlorinated hydrocarbons and aromatic hydrocarbons, and from about three to about 10 percent by weight of water, based on said nitrogen oxide, the reaction being initiated by actinic light.

6. A process for converting an organic disulfide to a sulfonic acid which comprises subjecting said compound to oxidation with at least the stoichiometric amounts of molecular oxygen in the presence of a catalytic amount of $NO_2$, a solvent selected from the group consisting of chlorinated hydrocarbons and aromatic hydrocarbons, and from about three to about 10 percent by weight of water, based on said nitrogen oxide, the reaction being initiated by actinic light.

7. A process for converting an organic compound of sulfur selected from the group consisting of mercaptans and disulfides to a sulfonic acid which comprises subjecting said compound to oxidation with at least the stoichiometric amounts of molecular oxygen in the presence of a catalytic amount of $NO_2$, carbon tetrachloride and from about three to about 10 percent by weight of water, based on said nitrogen oxide, the reaction being initiated by actinic light.

8. A process for converting a mercaptan to a sulfonic acid which comprises subjecting said compound to oxidation with at least the stoichiometric amounts of molecular oxygen in the presence of a catalytic amount of $NO_2$, carbon tetrachloride and from about three to about 10 percent by weight of water, based on said nitrogen oxide, the reaction being initiated by actinic light.

9. A process for converting an organic disulfide to a sulfonic acid which comprises subjecting said compound to oxidation wtih at least the stoichiometric amounts of molecular oxygen in the presence of a catalytic amount of $NO_2$, carbon tetrachloride and from about three to about 10 percent by weight of water, based on said nitrogen oxide, the reaction being initiated by actinic light.

10. A process for converting an organic compound of sulfur selected from the group consisting of mercaptans and disulfides to a sulfonic acid which comprises subjecting said compound to oxidation with at least the stoichiometric amounts of molecular oxygen in the presence of a catalytic amount of $NO_2$, benzene and from about three to about 10 percent by weight of water, based on said nitrogen oxide, the reaction being initiated by actinic light.

11. A process for converting a mercaptan to a sulfonic acid which comprises subjecting said compound to oxidation with at least the stoichiometric amounts of molecular oxygen in the presence of a catalyitc amount of $NO_2$, benzene and from about three to about 10 percent by weight of water, based on said nitrogen oxide, the reaction being initiated by actinic light.

12. A process for converting an organic disulfide to a sulfonic acid which comprises subjecting said compound to oxidation with at least the stoichiometric amounts of molecular oxygen in the presence of a catalytic amount of $NO_2$, benzene and from about three to about 10 percent by weight of water, based on said nitrogen oxide, the reaction being initiated by actinic light.

13. A process for converting n-dodecanethiol to sulfonic acid which comprises subjecting said compound to oxidation with at least the stoichiometric amounts of molecular oxygen in the presence of a catalytic amount of $NO_2$, carbon tetrachloride and from about three to about 10 percent by weight of water, based on said nitrogen oxide, the reaction being initiated by actinic light.

14. A process for converting n-dodecanethiol to sulfonic acid which comprises subjecting said compound to oxidation with at least the stoichiometric amounts of molecular oxygen in the presence of at least about three percent by weight of $NO_2$, based on said thiol, carbon tetrachloride and from about three to about 10 percent by weight of water, based on said nitrogen oxide, the reaction being initiated by actinic light.

15. A process for converting n-dodecanethiol to sulfonic acid which comprises subjecting said compound to oxidation with at least the stoichiometric amounts of molecular oxygen in the presence of at least three percent by weight of $NO_2$, based on said thiol, benzene, and from about three to about 10 percent by weight of water, based on said nitrogen oxide, the reaction being initiated by actinic light.

16. A process for converting didodecyl disulfide to a sulfonic acid which comprises subjecting said compound to oxidation with at least the stoichiometric amounts of molecular oxygen in the presence of at least about three percent by weight of $NO_2$, based on said disulfide, carbon tetrachloride and from about three to about 10 percent by weight of water, based on said nitrogen oxide, the reaction being initiated by actinic light.

References Cited

UNITED STATES PATENTS 3,048,531   8/1962   Stogryn et al. _____ 204—162

HOWARD S. WILLIAMS, *Primary Examiner.*

UNITED STATES PATENT OFFICE
CERTIFICATE OF CORRECTION

Patent No. 3,392,095                                         July 9, 1968

Harold L. Dimond et al.

It is certified that error appears in the above identified patent and that said Letters Patent are hereby corrected as shown below:

Column 1, line 26, after "n-octacosyl" insert -- n-nonacosyl --; line 27, after "cyclohexyl" insert a comma. Column 2, line 20, "this" should read -- the --.

Signed and sealed this 30th day of December 1969.

(SEAL)
Attest:

Edward M. Fletcher, Jr.                          WILLIAM E. SCHUYLER, JR.
Attesting Officer                                       Commissioner of Patents